(12) United States Patent
Angelis et al.

(10) Patent No.: US 10,236,744 B2
(45) Date of Patent: Mar. 19, 2019

(54) GENERATOR ASSEMBLY AND BEARING EQUIPPED WITH THE SAME

(71) Applicants: Georgo Angelis, Oss (NL); Nicolaas Simon Willem Den Haak, Zwijndrecht (NL); Koos Welling, Utrecht (NL)

(72) Inventors: Georgo Angelis, Oss (NL); Nicolaas Simon Willem Den Haak, Zwijndrecht (NL); Koos Welling, Utrecht (NL)

(73) Assignee: Aktiebolaget SKF, Göteborg (SE)

( * ) Notice: Subject to any disclaimer, the term of this patent is extended or adjusted under 35 U.S.C. 154(b) by 202 days.

(21) Appl. No.: 15/270,820

(22) Filed: Sep. 20, 2016

(65) Prior Publication Data

US 2017/0085152 A1    Mar. 23, 2017

(30) Foreign Application Priority Data

Sep. 21, 2015   (GB) .................... 1516659.8

(51) Int. Cl.
*H02K 11/00* (2016.01)
*H02K 5/22* (2006.01)
*H02K 7/18* (2006.01)
*F16C 32/04* (2006.01)
*H02K 11/04* (2016.01)
*H02K 11/05* (2016.01)

(52) U.S. Cl.
CPC ......... *H02K 5/225* (2013.01); *F16C 32/0457* (2013.01); *H02K 7/1846* (2013.01); *H02K 11/046* (2013.01); *H02K 11/05* (2016.01)

(58) Field of Classification Search
CPC ...... H02K 5/225; H02K 7/1846; H02K 11/05; H02K 11/046; F16C 32/0457
USPC ........................................... 310/71
See application file for complete search history.

(56) References Cited

U.S. PATENT DOCUMENTS

| | | | |
|---|---|---|---|
| 5,440,184 A * | 8/1995 | Samy ............... | B61D 43/00 310/90 |
| 9,227,823 B2 * | 1/2016 | Niarfeix ............. | B66F 9/08 |
| 2012/0169166 A1 | 7/2012 | Rink et al. | |
| 2014/0055010 A1 | 2/2014 | Sigal et al. | |

FOREIGN PATENT DOCUMENTS

| | | |
|---|---|---|
| JP | 2005233624 A | 9/2005 |
| JP | 2006090501 A | 4/2006 |
| JP | 2013061030 A | 4/2013 |
| WO | 2013160035 A2 | 10/2013 |
| WO | 2014101910 A2 | 7/2014 |
| WO | 2015032449 A1 | 3/2015 |

* cited by examiner

*Primary Examiner* — Jianchun Qin
(74) *Attorney, Agent, or Firm* — Bryan Peckjian; SKF USA Inc. Patent Dept.

(57) ABSTRACT

The invention relates to a generator assembly for harvesting energy in a bearing arrangement having a first ring and a second ring. The generator assembly includes a plurality of coils attached to the first ring and configured to interact with a magnet ring with alternating magnetization directions attached to the second ring. In order to provide a versatile power supply for electric and electronic external devices in machine applications, it is proposed to provide the generator assembly with a plug connector for supplying power generated by the generator assembly to external devices.

12 Claims, 2 Drawing Sheets

GENERATOR ASSEMBLY AND BEARING EQUIPPED WITH THE SAME

CROSS REFERENCE TO RELATED APPLICATIONS

This application claims priority to Great Britain patent application no. 1516659.8 filed on Sep. 21, 2015, the contents of which are fully incorporated herein by reference.

FIELD OF THE INVENTION

The invention relates to a generator assembly for use in bearing assemblies and to a bearing equipped with such a generator assembly.

BACKGROUND OF THE INVENTION

It is known to equip bearings with sensors and electronic devices of various types. These devices need to be powered while maintaining the bearing ISO dimensions. Further, the powering solutions should be scalable and cost efficient.

An internal power supply can be implemented by means of a battery, but this limits the "mission time" as the battery life is limited. In addition, the environmental conditions, e.g. high temperatures, are very demanding. A better way of an internal power supply is to generate the required power inside the bearing. The latter approach is also known as energy harvesting.

The U.S. Pat. No. 5,440,184 A discloses a double-row tapered roller bearing containing a generator for producing electrical energy. The generator includes a rotor and a stator arranged between the two rows or rollers. The rotor carries a plurality of permanent magnets with alternating polarity and the stator ring is provided with a plurality of teeth separating winding slots and carrying a coil respectively. The teeth and the central axes of the coil are oriented radially inward toward the permanent magnets.

The design proposed in U.S. Pat. No. 5,440,184 A is not very flexible and has limited range of functions.

The document WO 2013/160035 discloses a power generating assembly configured to be integrated in a bearing assembly, wherein the power generating assembly interacts with a magnetic wheel comprising magnetically polarized material with alternating directions of polarizations.

The above generator assemblies are designed and configured to supply power to electric and electronic devices such as microprocessors or wireless transmitters arranged within the for monitoring the bearing condition using temperature or vibration sensors of various kinds.

In a significant number of industrial applications, it is not trivial to have electric power available inside of mechanical systems where power would be needed e.g. for condition monitoring of mechanical components. In order to power the electric or electronic devices e.g. devices for reading out or processing sensor data in these applications, it is further known to supply power from the outside via wired connections.

BRIEF SUMMARY OF THE INVENTION

The invention seeks to provide a versatile power supply for electric and electronic external devices in mechanical applications.

The invention relates to a generator assembly for harvesting energy in a bearing arrangement having a first ring and a second ring, the generator assembly including a plurality of coils attached to the first ring and configured to interact with a magnet ring with alternating magnetization directions attached to the second ring.

In order to provide a versatile power supply for electric and electronic external devices in machine applications, it is proposed to provide the generator assembly with a plug connector for supplying power generated by the generator assembly to external devices.

Bearings of different kinds exist in an extremely wide range of mechanical applications, even deep within the mechanical core thereof. By providing the bearing with a generator function and a plug connector, it is possible to provide a versatile power supply in many possible places by simple means and to thereby equip the mechanical applications with electronics e.g. for condition monitoring or other aims. Limitations as imposed by battery solutions or by connections with the grid can be avoided.

The plug connector can be of any kind, female or male and may in a preferred embodiment of the invention fit into the ISO dimensions of the bearing.

The generator assembly may be integrated in a bearing or provided separately as a retrofit device fitting the ISO dimensions of a standard bearing.

The invention is applicable to various kinds of bearings including roller bearings, ball bearings or needle bearings, with or without lubrication holes or grooves and with or without sealing rings or caps. In particular, the invention is applicable for spherical roller bearings, e.g. of the ISO type 22220 W20 or 22220 W33.

Preferably, a set of rolling elements is arranged between the first ring and the second ring and guided in a cage. It is possible to attach the coils and/or the magnet ring to the cage. Further, the generator can be a variable reluctance generator with permanent magnets arranged in yokes carrying the coils or a generator with a magnet ring with alternating magnetization directions.

In a preferred embodiment of the invention, a first portion of the generator assembly is arranged on a first axial side of the bearing and a second portion of the generator assembly is arranged on a second axial side of the bearing opposite to the first axial side, wherein the generator assembly further includes a conductor for connecting the first portion of the generator assembly with the second portion of the generator assembly. By using the space available on both sides of the bearing, additional space for the sensor, the actuator and the additional electronics can be made available and/or the rated power of the generator assembly can be doubled as compared to otherwise identical solutions with coils and magnet rings on only one side.

It is further proposed that one of the bearing rings is provided with a groove, wherein the groove accommodates the conductor. The conductor can be protected and screened while maintaining the ISO dimensions of the bearing.

In one embodiment of the invention, the first ring is an outer ring of the bearing, the groove is formed on an outer circumference of the first ring and has a helicoidal shape. In another embodiment of the invention, the first ring is an inner ring of the bearing, the groove is formed on an inner circumference of the first ring and has a helicoidal shape. The first ring may be a rotating ring or a non-rotating ring depending on whether the external devices to be powered are attached to a rotating part or to a non-rotating part of the mechanical application.

The helix angle is preferably set so as to find a balance between the costs of machining—which increase with the length of the groove—and the stability in terms of stress increase, which speaks in favor of a shallower helix angle.

The inventors have found that a good balance can be found for a helix angle between 30° and 60°, preferably around 45°. The impact on stress is strongly reduced below 45°.

In a preferred embodiment of the invention, the conductor is formed as a conductive flex print, by printing, etching technologies or by copper deposition.

It is further proposed that the conductor is encapsulated within the groove. The encapsulation material can be used as anti-creeping-rotation means or anti rotation lock for the bearing.

According to a further aspect of the invention, it is proposed that the generator assembly includes a connector portion with the plug connector, a coil portion including the coils and means for transferring power from the connector portion to the coil portion, wherein the connector portion is configured so as to be rotatable in relation to the coil portion in order to allow for a creeping rotation of the first ring. This increases the versatility of the device because creeping rotation of the stationary ring is a phenomenon which is difficult to avoid in many applications.

In a preferred embodiment of the invention, the means for transferring power from the connector portion to the coil portion includes a pair of interacting inductor coils. Preferably, the coils are strongly interacting and arranged coaxially, parallel and close to each other so as to maximize the counter-inductivity.

The means or transferring power between the two rotating portions can be dispensed with where the bearing includes and anti-rotation means or anti-rotation lock for avoiding a creeping rotation of the bearing within a bearing housing or bearing seat in its final application.

According to a further aspect of the invention, it is proposed that the generator assembly further includes at least one inverter circuit for conditioning the power generated in the coils to a desired type of AC or DC voltage. Preferably, at least a part of the inverter circuit is accommodated in a housing of the plug connector, which may be connected to the remainder of the power generator assembly by a wire.

A yet further aspect of the invention relates to a bearing assembly including a bearing equipped with a generator assembly as described above.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE INVENTION

Figure 1:
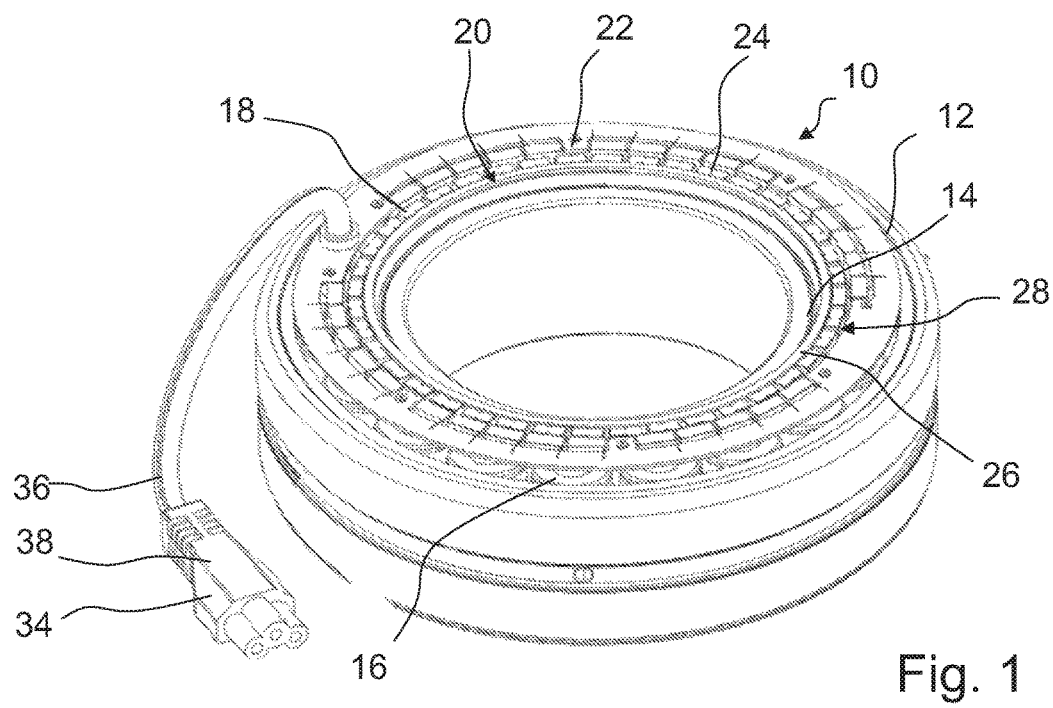
FIG. 1 is a perspective view of a generator assembly according to a first embodiment the invention mounted to a bearing.

FIG. 1 is a perspective view of a spherical roller bearing 10 equipped with a generator assembly according to the invention.

The generator assembly is provided for harvesting energy in a bearing arrangement having an outer ring 12 as the first ring and an inner ring 14 as the second ring and a row of spherical rollers 16 accommodated in a rolling chamber between the first ring 12 and the second ring 14.

The generator assembly includes a plurality of coils 18 attached to the outer ring 12 and configured to interact with a magnet ring 20 with alternating magnetization directions attached to the inner ring 14. The coils 18 are encapsulated and mounted in an outer carrier ring 22 such that the winding axis is oriented in a radial direction of the bearing 10 and the magnet ring 20 is composed of plural permanent magnets 24 attached to an inner carrier ring 26 attached to the inner ring 14 of the bearing 10.

In order to provide a versatile power supply for electric and electronic external devices in machine applications, the generator assembly includes a plug connector 34 for supplying power generated by the generator assembly to external devices. The plug connector 34 is connected to the body of the bearing 10 by a wire 36 and includes a plastic housing 38 which may be configured to receive power electronics devices.

The below description of the second and third embodiments of the invention is limited to the differences to the first embodiment of the invention for the sake of simplicity. For the same reason, the plug connector is omitted in FIG. 2.

Figure 2:
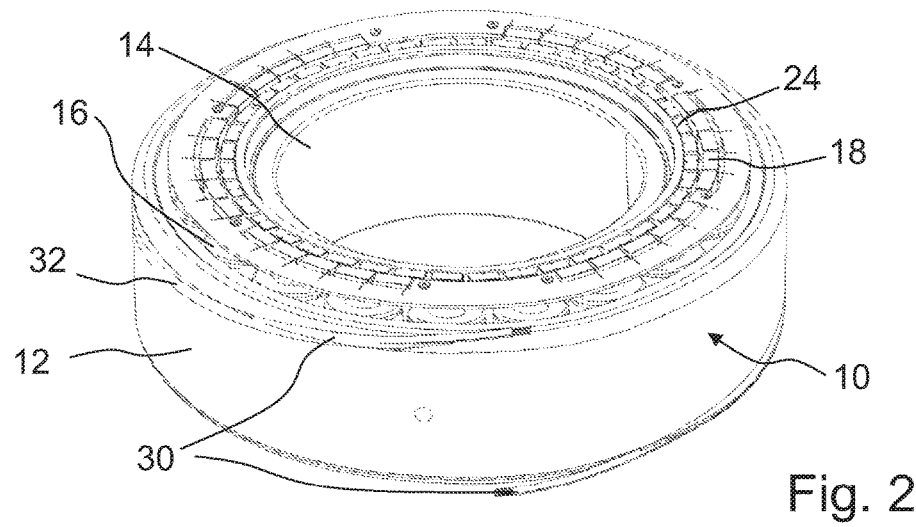
FIG. 2 is a perspective groove of a bearing with parts of a generator assembly according to a second embodiment of the invention.

In cases where the power generated by generator means on one side of the bearing is needed on the other axial side of the bearing, the bearing as illustrated in FIG. 2 with the conductor connecting both sides for power transfer could be used without the plug connector as shown in FIG. 1. If the power is needed for external devices, the plug connector should be provided.

FIG. 2 illustrates a second embodiment of the invention, wherein identical arrangements of coils 18 and magnets 24 are provided on both axial sides of the bearing 10, wherein only one of the sides is illustrated for the sake of simplicity. Specifically, a first portion 28 of the generator assembly including a first magnet ring 20 and a first row of coils 18 is arranged on a first axial side of the bearing 10 and a second portion (not Illustrated) of the generator assembly including a second magnet ring and a second row of coils is arranged on a second axial side of the bearing 10 opposite to the first axial side.

In order connect the first portion 28 of the generator assembly with the second portion thereof; the generator assembly further includes a conductor 30 for connecting the first portion 28 of the generator assembly with the second portion of the generator assembly. The conductor 30 is illustrated in a configuration prior to being connected to the two portions of the generator assembly and prior to being encapsulated by overmolding or potting in FIG. 2 for reasons of visibility.

The outer ring 12 of the bearing according to FIG. 2 is provided with a groove 32, wherein the groove accommodates the conductor 30. The conductor 30 is formed by a conductive flex print in a bottom portion of the groove 32, which is encapsulated to be protected. The groove 32 has a helicoidal shape, wherein a helix angle is set such that the conductor 30 extends over one round of over the ring, i.e. the tangent of the helix angle is equal to the ratio between width and circumference of the outer ring. In other embodiments of the invention, the helix angle of the groove is 45° or more.

Figure 3:
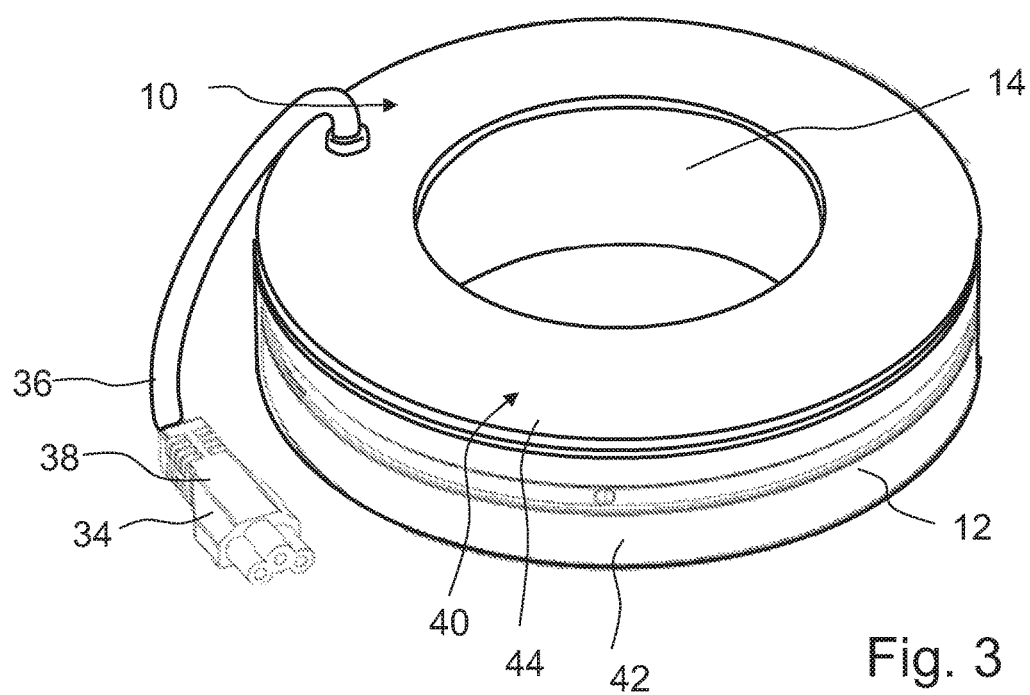
FIG. 3 is a perspective view of a generator assembly according to a third embodiment the invention mounted to a bearing.

FIG. 3 is a perspective view of a generator assembly according to a third embodiment the invention mounted to a bearing 10. In the third embodiment of the invention, the bearing 10 includes a connector portion 40 with the plug connector 34, a coil portion 42 including the coils 18 and means (not illustrated) for transferring power from the connector portion to the coil portion, wherein the connector portion 40 is configured so as to be rotatable in relation to the coil portion 42 around the rotation axis of the bearing 10 in order to allow for a creeping rotation of the first ring 12.

A body part 44 of the connector portion 40 is formed like an SNL spacer ring including a first inductor coil (not illustrated) interacting with a second, parallel and coaxial inductor coil (not illustrated) provided in the coil portion 42 of the generator assembly. This strongly interacting pair of coils is the means for transferring power from the connector portion 40 to the coil portion 42.

In applications where creeping of the outer ring in a housing may occur, the coil portion 42 of the generator assembly will follow the creeping rotation of the outer ring 12 while the connector portion 40 can remain stationary thanks to the rotatable connection.

Anti-rotation means, which should otherwise be provided in order to avoid stress on the connector plug 34 or the wire 36, can be dispensed with in the third embodiment of the invention.

One further embodiment of the invention including such anti-rotation means for avoiding a creeping rotation of the bearing within a bearing housing uses the encapsulation of the conductor 30 for this purpose, which may be formed using elastomeric material and such that it slightly protrudes over the outer circumferential surface of the outer ring 12.

In the above embodiments, the generator assembly may further include at least one inverter circuit for conditioning the power generated in the coils to a desired type of AC or DC voltage. In the preferred embodiment of the invention, at least a part of the inverter circuit is accommodated in the housing 38 of the plug connector 34. By providing different versions of inverter circuits in different versions of plug connectors 34, it is easy to realize different versions of the generator circuit, e.g. a 5V, 12V or 24V version.

The invention claimed is:

1. A generator assembly for harvesting energy in a bearing arrangement having a first ring and a second ring, the generator assembly comprising:
   a plurality of coils attached to the first ring and configured to interact with a magnet ring with alternating magnetization directions attached to the second ring, and
   a plug connector for supplying power generated by the generator assembly to external devices, wherein
   a first portion of the generator assembly is arranged on a first axial side of the bearing arrangement and a second portion of the generator assembly is arranged on a second axial side of the bearing arrangement opposite to the first axial side, and wherein
   the generator assembly further includes an electrical conductor for electrically connecting the first portion of the generator assembly with the second portion of the generator assembly.

2. The generator assembly according to claim 1, wherein one of the bearing rings is provided with a groove, and wherein the groove accommodates the conductor.

3. The generator assembly according to claim 2, wherein the first ring is an outer ring of the bearing, and wherein the groove is formed on an outer circumference of the first ring and is helicoidally shaped.

4. The generator assembly according to claim 3, wherein a helix angle of the groove is 45° or more.

5. The generator assembly according to claim 1, wherein the conductor is formed as a conductive flexible printed circuit.

6. The generator assembly according to claim 1, wherein the conductor is encapsulated within the groove.

7. The generator assembly according to claim 1, further comprising a connector portion including a plug connector, a coil portion including the coils configured for transferring power from the connector portion to the coil portion, wherein the connector portion is configured to be rotatable in relation to the coil portion in order to allow for a creeping rotation of the first ring.

8. The generator assembly according to claim 7, wherein the plug connector and coils configured for transferring power from the connector portion to the coil portion includes a pair of interacting inductor coils.

9. The generator assembly according to claim 1, further comprising anti-rotation means configured for avoiding a creeping rotation of the bearing within a bearing housing.

10. The generator assembly according to claim 1, further comprising at least one inverter circuit for conditioning the power generated in the coils to a desired type of AC or DC voltage.

11. The generator assembly according to claim 10, wherein at least a part of the inverter circuit is accommodated in a housing of the plug connector.

12. A bearing assembly including a bearing equipped with the generator assembly according to claim 1.

* * * * *